(12) United States Patent
Hole et al.

(10) Patent No.: US 7,839,271 B2
(45) Date of Patent: Nov. 23, 2010

(54) DRIVING ASSISTANCE SYSTEM FOR INTERACTION BETWEEN A MOBILE ELEMENT AND AN INFRASTRUCTURE

(75) Inventors: Stephane Hole, Paris (FR); Daniele Fournier, Paris (FR); Celine Filloy-Corbrion, Paris (FR)

(73) Assignees: Centre National de la Recherche Scientifique -CNRS-, Paris Cedex (FR); Universite Piere & Marie Curie, Paris (FR)

( * ) Notice: Subject to any disclaimer, the term of this patent is extended or adjusted under 35 U.S.C. 154(b) by 998 days.

(21) Appl. No.: 11/566,047

(22) Filed: Dec. 1, 2006

(65) Prior Publication Data

US 2008/0189038 A1 Aug. 7, 2008

(51) Int. Cl.
*B60Q 1/00* (2006.01)

(52) U.S. Cl. .................. 340/435; 340/905; 340/933; 340/999; 180/168; 701/300

(58) Field of Classification Search .......... 340/999, 340/993, 939, 941, 435, 905, 904, 937; 180/167, 180/168; 701/300, 207, 1, 208, 224; 702/150, 702/152, 94, 95; 700/56–68
See application file for complete search history.

(56) References Cited

U.S. PATENT DOCUMENTS

| 4,310,862 | A | | 1/1982 | Schwarz | |
|---|---|---|---|---|---|
| 4,401,181 | A | * | 8/1983 | Schwarz | 180/168 |
| 6,289,269 | B1 | | 9/2001 | Seiferling | |
| 6,772,062 | B2 | * | 8/2004 | Lasky et al. | 701/207 |
| 2003/0155910 | A1 | | 8/2003 | Bartingale et al. | |

FOREIGN PATENT DOCUMENTS

| DE | 196 40 929 | 5/1998 |
|---|---|---|
| WO | WO 97/14850 | 4/1997 |

OTHER PUBLICATIONS

French Preliminary Search Report FR 0405957; report dated Jan. 19, 2005.

* cited by examiner

*Primary Examiner*—Anh V La
(74) *Attorney, Agent, or Firm*—Miller, Matthias & Hull

(57) ABSTRACT

The invention concerns a driving aid system for supplying data to a vehicle running on an infrastructure, and comprising a magnetic marking formed on the infrastructure and adapted to encode data addressed to the vehicle, the data being modifiable, and a detection device comprising a plurality of magnetic sensors onboard the vehicle for detecting a total magnetic field including the magnetic field generated by the magnetic marking and for producing signals representing the total magnetic field, and a processing unit adapted to process the representative signals, and to determine a first distance between the vehicle and the magnetic marking, and to decode the data encoded on the magnetic marking.

45 Claims, 3 Drawing Sheets

DRIVING ASSISTANCE SYSTEM FOR INTERACTION BETWEEN A MOBILE ELEMENT AND AN INFRASTRUCTURE

CROSS-REFERENCE TO RELATED APPLICATION

This is the U.S. National Phase of International Application No PCT/FR2005/01351 filed 1 Jun. 2005, the entire disclosure of which is incorporated herein by reference.

FIELD OF THE DISCLOSURE

The invention relates in general to information and guiding systems, also called driving assistance systems, for a mobile element traveling on an infrastructure, and more specifically to a system using a magnetic field.

BACKGROUND OF THE DISCLOSURE

In the context of road safety, for example, numerous fatal accidents are caused by vehicles running off the road. It is therefore important to have continuous awareness of the position of the vehicle, regardless of the environmental or climatic conditions. Prevention of running off the road can be further increased if information on the infrastructure (signaling, radius of curvature, camber, etc.) is supplied to the vehicle.

Numerous guidance and information transmission systems already exist. Of these, the choice of a magnetic detection system yields many advantages. This is because the magnetic properties of materials are practically unchanged by external climatic conditions such as rain, mist, brightness, etc. A system of communication between a mobile element and an infrastructure based on magnetism is also independent of the external environment in the form of tunnels, valleys, and the like.

There are known information systems based on magnetic methods, which use magnetic marking in the form of permanent magnets. In this case, the magnets generally serve only as positioning references. Their use for encoding information can only be limited. This is because the information is fixed and can only be modified by replacing a magnet having a certain polarity with another magnet of different polarity. The cost of modifying the information encoded by the permanent elements is therefore high. The magnetic detection system fitted in a vehicle has to detect a magnetic field whose attenuation is proportional to the cube of the distance between the permanent magnet and the magnetic sensor. Consequently, the magnetic field becomes very weak when the distance between the emitter and receiver increases, leading to poor performance of the positioning system.

The use of magnetic marking in the form of a magnetic strip deposited on or in the infrastructure is a helpful alternative. This is because the magnetic field can be inversely proportional to the square of the distance between the strip and the on-board sensor, rather than to the cube as in the case of individual permanent magnets.

U.S. Pat. No. 6,289,269 B1 discloses a system for guiding a vehicle on an infrastructure, comprising a continuous guide in the form of a magnetic strip applied to the surface of this infrastructure. A double vertical magnetic sensor is used to measure the magnetic field of the strip and the surrounding magnetic field in its lower part, and the surrounding magnetic field only in its upper part which is farther from the magnetic strip. The position of the vehicle is then deduced from the difference between these two measured magnetic fields. However, this method cannot provide a precise value of the positioning of the vehicle on the infrastructure. This is because the proposed double sensor does not take into account the variation of the surrounding magnetic field or the influence of metallic bodies. Furthermore, the magnetic strip is used only for guiding the vehicle.

SUMMARY OF THE DISCLOSURE

The object of the present invention is to propose an innovative driving assistance system, comprising in particular a magnetic marking deposited on or in an infrastructure and composed of magnetizable particles, which is inexpensive and which allows simple reprogramming of the data encoded in this strip. It also relates to a detection device for this driving assistance system, as well as the infrastructure on or in which the magnetic marking is formed.

For this purpose, the present invention proposes a driving assistance system to supply information to a vehicle traveling on an infrastructure, and which comprises:

a magnetic marking formed on or in the infrastructure and adapted to encode the information intended for the vehicle, the information being modifiable, a detection device comprising a plurality of magnetic sensors placed on board the vehicle to detect a total magnetic field comprising the magnetic field generated by the magnetic marking and to produce signals representing the total magnetic field, and a processing unit adapted to process the representative signals and to determine, on the one hand, a first distance between the vehicle and the magnetic marking, and, on the other hand, to decode the information encoded in the magnetic marking.

Thus the magnetic field emitted by the magnetic marking can be used to calculate the position of the vehicle and to inform the driver on the basis of the encoded information, which may change over time and therefore be re-encoded.

In a supplementary embodiment, the magnetic marking is formed by depositing a marking compound intended for road signaling, to which are added one or more magnetic materials in the form of particles, these particles being capable of receiving remanent magnetization when subjected to a magnetic field greater than the coercive magnetic excitation fields of the particles, the remanent magnetization of these particles being adapted to encode the information intended for the vehicle.

The magnetic marking uses known road signaling methods. A simple addition of magnetic particles enables the information to be encoded and reprogrammed by subjecting the particles to a magnetic field greater than their coercive excitation fields.

In an advantageous embodiment, there are at least two different varieties of magnetic materials in the magnetic marker, each having a different coercive magnetic excitation field, so that the information intended for the vehicle can be encoded with different safety levels, the most important information being encoded with the magnetic materials having the highest coercive magnetic excitation fields.

Thus different levels of information can be provided If there is an error in the programming of the less important information, the more important information is not deleted.

Advantageously, the magnetic marker is deposited in a substantially continuous way in the form of a magnetic strip, and the information is encoded in it at substantially regular elementary intervals along the length of the magnetic strip, each of the elementary intervals having its own multidirectional magnetic field.

In another embodiment, the magnetic marker is deposited in the form of a discontinuous magnetic strip formed by substantially regular elementary intervals, and the information is encoded in each regular elementary interval, each of the elementary intervals having its own multidirectional magnetic field.

Thus, for these two embodiments, each interval corresponds to a portion of the strip with a variable magnetization, enabling a plurality of bits of information to be encoded.

The multidirectional magnetic field also comprises at least one first component in a direction substantially perpendicular to, but coplanar with, the direction of said strip.

This first component not only encodes information but can also be used to define a position reference for the mobile element in the infrastructure.

The present invention also relates to a driving assistance system fox a vehicle on a road infrastructure, in which the plurality of magnetic sensors comprises at least three magnetic sensors, the processing unit also being adapted to eliminate the surrounding magnetic field from the total magnetic field on the basis of the representative signals from the magnetic sensors.

Thus the driving assistance system can take surrounding noise into account in order to find the position of the vehicle in the infrastructure with greater accuracy.

In a preferred embodiment, the driving assistance system can comprise at least a fourth magnetic sensor, the processing unit also being adapted to take into account the bias due to the variations of the surrounding magnetic field, particularly those due to the distribution of metallic bodies, on the basis of the representative signals from the magnetic sensors.

In another embodiment, the magnetic sensors are aligned on a first axis substantially perpendicular to the axis of the vehicle, and at least one supplementary magnetic sensor is available and positioned on a second axis which is different from the first axis, so that the processing unit determines a second distance between the vehicle and the magnetic strip, the processing unit determining, on the basis of the first and the second distances, the orientation of the vehicle with respect to its direction of movement on the infrastructure.

The invention also relates to a detection device for the above driving assistance system, comprising a plurality of magnetic sensors intended to be placed on board a vehicle to detect a total magnetic field comprising the magnetic field generated by a magnetic marking formed on or in an infrastructure, and to produce signals representing the total magnetic field, and a processing unit adapted to process the representative signals and to determine a first distance between the vehicle and the magnetic marker, the plurality of magnetic sensors comprising at least three magnetic sensors, and the processing unit also being adapted to eliminate the surrounding magnetic field from the total magnetic field on the basis of said representative signals.

In another embodiment of the detection device, the plurality of magnetic sensors comprises a fourth magnetic sensor, and the processing unit is also adapted to take into account the bias due to the variations of the surrounding magnetic field, particularly those due to the distribution of metallic bodies, on the basis of the representative signals from the magnetic sensors.

In a supplementary embodiment of the detection device, the processing unit is also adapted to decode the information encoded in the magnetic marking.

The invention also relates to an infrastructure for the above driving assistance system, comprising a magnetic marking formed on or in the infrastructure, and adapted to encode information intended for a vehicle traveling on this infrastructure, the magnetic marking being formed by the deposition of a marking compound intended for road signaling, to which are added one or more magnetic materials in the form of particles, these particles being capable of receiving remanent magnetization when subjected to a magnetic field greater than the coercive magnetic excitation fields of these particles, the remanent magnetization of the magnetic marking being adapted to encode the information intended for said vehicle.

In an advantageous embodiment of the infrastructure, there are at least two different varieties of magnetic materials in the magnetic marker, each having a different coercive magnetic excitation field, so that the information intended for the vehicle can be encoded with different safety levels, the most important information being encoded with the magnetic materials having the highest coercive magnetic excitation fields.

The invention also relates to a vehicle which can travel on this infrastructure, and which is equipped with the above detection device, this device being used to determine at least a first distance between the vehicle and the magnetic marking, and to decode the information encoded in the magnetic marking.

Finally, the invention relates to a driving assistance method for a vehicle traveling on an infrastructure, comprising a magnetic marking formed on or in the infrastructure and adapted to encode information intended for the vehicle, this vehicle having a detection device which comprises a plurality of magnetic sensors placed on board the vehicle to detect a total magnetic field comprising the magnetic field generated by the magnetic marking, and to produce signals representing this total magnetic field, and a processing unit for the representative signals, the method comprising the following steps:

a) using the plurality of magnetic sensors to measure the total magnetic field, b) using the processing unit to determine the information encoded in the magnetic marking, on the basis of the representative signals, c) using the processing unit to determine a first distance between the vehicle and the magnetic marker on the basis of the representative signals, d) transmitting the encoded information and the first distance to a module forming an interface with the driver of the vehicle.

BRIEF DESCRIPTION OF THE DRAWINGS

Other characteristics and advantages of the invention will become clear in the light of the following description. This description is purely illustrative and is to be read with reference to the attached drawings, in which.

DETAILED DESCRIPTION

Figure 1:
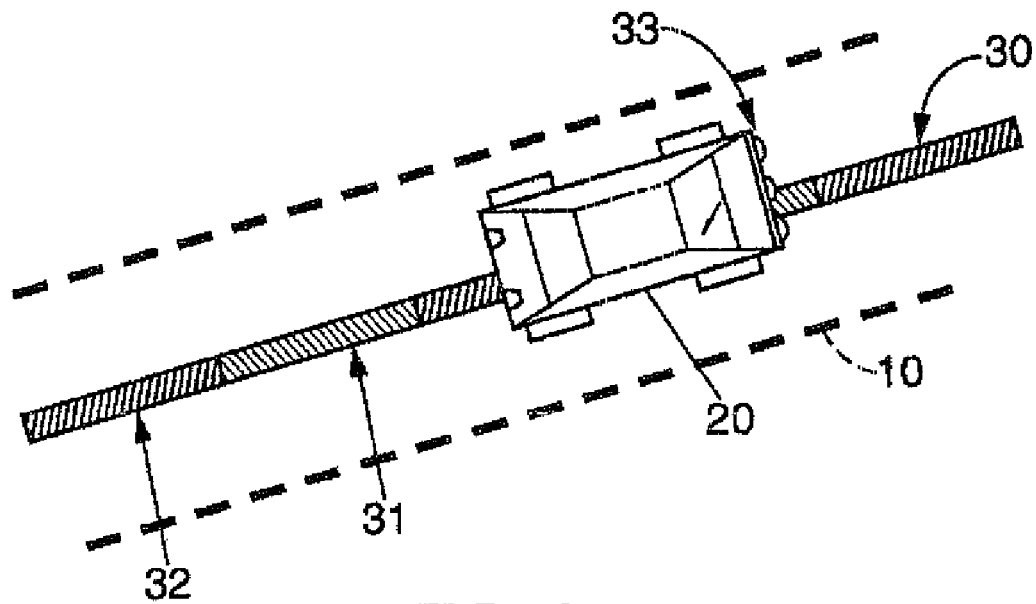
FIG. 1 shows a schematic diagram of the driving assistance system according to the invention.

The magnetic marking and the driving assistance system according to the invention are shown in the schematic diagram of FIG. 1.

A vehicle 20 travels on an infrastructure represented by the road 10 shown in broken lines in FIG. 1. The term "road infrastructure" denotes all the carriageways of a network used for the movement of mobile elements. These can of course include roads, but they can also include smaller-scale networks such as traffic routes on an industrial site, in a building, etc A magnetic marking, shown in the form of a continuous magnetic strip 30, is deposited in the middle of the road 10. This magnetic strip is formed by a sequence of intervals (31, 32) having their own magnetic fields with different characteristic properties. The magnetic marking can also take the form of a magnetic strip comprising a sequence of discontinuous intervals, each having its own magnetic field with different characteristics. As explained below, this sequence of different magnetic fields makes it possible to encode information of varying importance along the magnetic marking. A set of on-board magnetic sensors 33 is placed at the front of the vehicle 20 for reading the magnetic fields of the magnetic strip 30, for the purpose of calculating the position of the vehicle 20 with respect to the magnetic strip 30 and therefore to the infrastructure 10 on the one hand, and of reading the information encoded in the magnetic strip 30 on the other hand.

In the diagram of FIG. 1, the magnetic marking is positioned in the center of the lane 10 in which the vehicle 20 is traveling. The ideal position of the vehicle then corresponds to a zero horizontal distance between the principal axis of the vehicle 20 and the magnetic strip 30. However, other cases can be envisaged, particularly those in which the strip is positioned, for example, on the lateral white line of the road, or in any other position which is off-center with respect to the position of FIG. 1. In the remainder of the description, the magnetic strip is assumed to be in a central position, to simplify matters.

Figure 2:
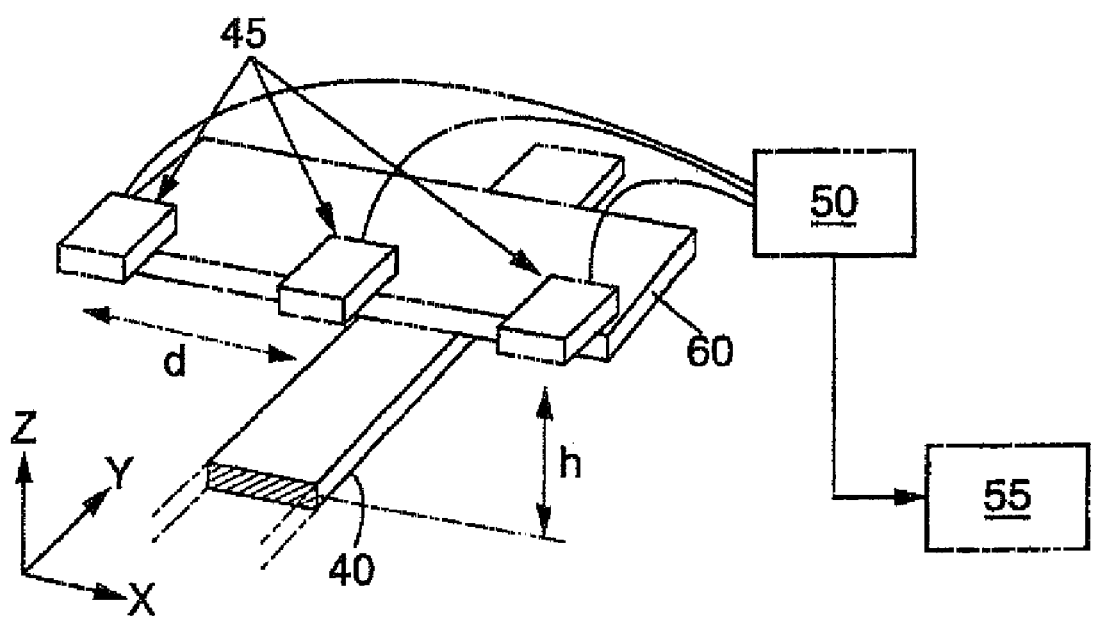
FIG. 2 shows a diagram of an embodiment of the driving assistance system and of the detection device comprising magnetic sensors according to the invention.

FIG. 2 shows a diagram of the embodiment of the detection device used in the driving assistance system according to the invention. The device comprises a detection part comprising a support 60 attached to the vehicle (not shown in the diagram). The support 60 preferably lies in a direction perpendicular to the principal axis of the vehicle. The principal axis of the vehicle also lies along its direction of movement. The support 60 comprises at least three on-board magnetic sensors 45, and is placed under the vehicle, for example, so that the height h between this support 60 and the magnetic marking, in this case also represented in the form of a magnetic strip 40, is of the order of several tens of centimeters. It is preferably about 20 to 30 centimeters, in order to permit the reading of a magnetic field of sufficient amplitude, this amplitude varying as a function of the square of the distance between the magnetic strip and the sensors. The magnetic sensors 45 are aligned on the support 60, and are connected to a processing unit 50 which is also included in the detection device. This processing unit 50 is adapted to analyze the signals of the magnetic sensors 45, and in particular to determine the distance between the magnetic strip 40 and the vehicle, as well as to read or decode any information encoded in the magnetic strip. The sensors 45 are preferably aligned on a single straight line perpendicular to the principal axis of the vehicle.

The magnetic sensors can be housed, for example, in a vehicle bumper located at a height of approximately 25 cm above the road and thus also above the magnetic strip. They sense a total magnetic field. They must be capable of measuring very weak magnetic fields at high speed (the speed of the vehicle), and it is therefore necessary to choose sensitive sensors having a low noise and a fast response time. They must be capable of operating with a supply voltage which can be provided using the voltages available in the vehicle, and must have low power consumption. Known magnetic sensors, such as Hall effect sensors and magnetoresistive sensors, have these characteristics. Current loop sensors can also be used.

Table 1 below shows examples of characteristics of various types of known sensors.

TABLE 1

| usual characteristics of different types of magnetic sensor | | | | |
|---|---|---|---|---|
| Type of sensor | Noise (nV/Hz) | Sensitivity (mV/Gauss) | Response time (μs) | Power consumption (V/mA) |
| Hall effect | 75 | 25 | 3 | 6.6 at 12 V/30 mA |
| magnetoresistive | 29 | 2.5 | 0.2 | 5.0 at 10 V/30 mA |

The sensors can also be directional, in other words capable of detecting the direction of the magnetic fields when they have non-zero components in directions other than the direction parallel or perpendicular to the magnetic strip.

The distance determined by the processing unit 50, together with the decoded information, is then transmitted to a module 55 which performs a number of functions, such as the merging of the data, the use of the decoded information, the transmission of the position of the vehicle to the driver, the transmission to the driver of the information at different levels read from the magnetic strip, etc. Warning messages can be provided in order to draw the driver's attention to an excessive departure of the vehicle axis from the magnetic strip, or to important information encoded in the magnetic strip (approaching a tight corner, slow down, etc.) as mentioned in the rest of the description. For example, it is possible to consider displaying for the driver's attention the position of his vehicle with respect to the strip, in the center of the lane in which he is traveling, or any other appropriate means of display, so that he can be aware of the distance between the vehicle and the lane and consequently take corrective action if necessary.

The number of sensors is a decisive factor for the accuracy of the determination of the distance between the vehicle and the infrastructure, together with the decoding of the information recorded on the magnetic strip. As pointed out in relation to the known guidance devices, the use of two sensors is insufficient, in view of the environmental noise and the effect of metallic bodies in the vicinity. This is because the signals from the magnetic sensors relate to the measurement of a total magnetic field which incorporates, in particular, the magnetic fields due to the magnetic strip and the surrounding magnetic fields (the Earth's magnetic field, etc.). They are also affected by the various metallic bodies in the vicinity.

A driving assistance system according to the invention, together with the detection device, has at least three magnetic sensor's, making it possible to allow for the surrounding magnetic field when processing the signals from the sensors. In fact, the number of magnetic sensors is chosen in accordance with the desired accuracy of measurement of the distance between the vehicle and the magnetic strip. By using a fourth magnetic sensor, it is also possible to allow for a variation in the surrounding magnetic field, due for example to the effect of the various metallic bodies in the vicinity on the values of the signals from the magnetic sensors.

In order to estimate the position of the vehicle with respect to the magnetic strip placed on the infrastructure, the processing unit compares the response from each sensor to a standard response, the latter being close to the theoretical response which these sensors would supply in the presence of a total magnetic field due in particular to a given magnetization strip in a given position and to the presence of a surrounding field. The parameters of the standard response of the sensors which best fit to the measurements are considered to be the results of the processing.

To illustrate the distance estimation, let us assume that the magnetic marking formed on or in the infrastructure takes the form of a continuous magnetic strip, generating a unidirectional magnetic field coplanar with and perpendicular to the direction of the strip. The sensors are also considered to be aligned on a support perpendicular to the principal axis of the vehicle. The magnetic field then takes the form $$f(xi, d) = a + b(xi - d) + \frac{c((xi - d)^2 - h^2)}{h^2 + (xi - d)^2} \quad (1)$$

where a is a constant to allow for the surrounding magnetic field, particularly the Earth's magnetic field, b is the bias due to variations in the surrounding magnetic field, due for example to metallic bodies in the vicinity, c is the amplitude of the unidirectional magnetic field of the strip. This amplitude permits the encoding of the information intended for the vehicle. By determining this, therefore, it is possible to deduce the information encoded in the strip from its variation from one elementary interval to the next (as shown in FIG. 1, at the positions marked 31 and 32), xi are the positions of the different sensors along the support, h is the vertical distance between the magnetic strip and the sensors, and d is the distance measured horizontally between the center of the set of magnetic sensors and the magnetic strip. The knowledge of this distance makes it possible to know the continuous positioning of the vehicle.

In the description of the method below, it is assumed that the number of magnetic sensors is 5, that they are equidistant, and that the distance d is equal to the horizontal distance between the central sensor (the third sensor) and the magnetic strip.

On the basis of the values f(xi,d), shown as fxi in the rest of the description, we can introduce supplementary functions gxi and hxi, in order to eliminate the various unknown constants a and b due to the surrounding magnetic field and its variations from equation (1):

gxi=fxi+1−fxi, based on the values of fxi where i∈[1, 4], to eliminate a, hxi=gxi+1−gxi, based on the values of gxi where i∈[1, 3], to eliminate b.

These values fxi, gxi and hxi are functions of the distance d to be estimated and the amplitude c of the field encoding the information in the strip, and form the values of the standard response mentioned above. The shape (1) of the magnetic field and the values gxi and hxi clearly show the usefulness of a system having at least three sensors if it is desired to eliminate the surrounding magnetic field (parameter a), and the usefulness of a fourth sensor if it is desired to allow for the metallic bodies in the vicinity (parameter b). This is because it is necessary to have at least as many independent measures as there are different parameter's.

On the basis of the measurements Mfxi of the magnetic field measured by the magnetic sensor at the position xi, it is also possible to introduce the values Mgxi and Mhxi calculated according to the same relations as the values gxi, hxi and kx1. Thus:

Mgxi=Mfxi+1−Mfxi, based on the measurements Mfxi,

Mhxi=Mhxi+1−Mhxi, based on the values Mgxi.

By applying the least squares criterion to the different values shown above, the position of the strip can be estimated as closely as possible.

Let Jf be the least squares function for the values fxi:

$$Jf = \sum_{i=1}^{i=5} (fxi - Mfxi)^2 \quad (2)$$

This function Jf depends, in particular, on d and c. Its minimum can be used to obtain an estimate of d and c based on the values measured by the 5 magnetic sensors. The least squares criterion can also be applied to the values gxi and hxi to eliminate the parameters unnecessary for the estimation of d and c, in other words a and b.

For what is known as a double estimation function, the least squares criterion is applied to the values hxi of the standard response, yielding:

$$Jh = \sum_{i=1}^{i=3} (hxi - Mhxi)^2 \quad (3)$$

When we introduce hxi=c.h'xi, i∈[1, 3], where h'xi is a function of d only, equation (3) becomes:

$$Jh = \sum_{i=1}^{i=3} (ch'xi - Mhxi)^2 \quad (3')$$

where c is a constant in the equation (3'), $$\frac{\partial Jh}{\partial c} = 0$$

produces the new relation:

$$c = \frac{h'x1 \cdot Mhx1 + h'x2 \cdot Mhx2 + h'x3 \cdot Mhx3}{h'x1^2 + h'x2^2 + h'x3^2} \quad (3'')$$

This estimation of c provides the information stored in the magnetic strip and enables Jh to be a function of d only, and its minimum can be used to estimate the distance d for each measurement Mfxi obtained from the 5 sensors.

Figure 3A:
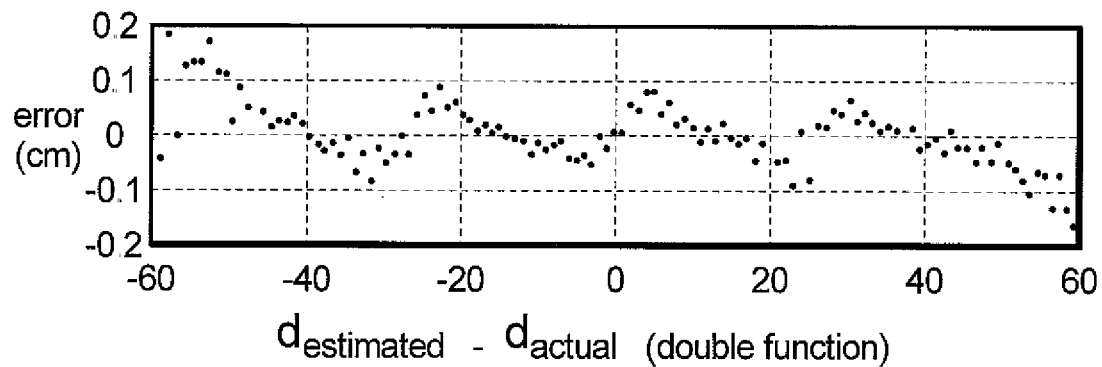
FIG. 3a shows the difference between the double function for estimating the position of the vehicle and its actual position with respect to the magnetic strip.

FIG. 3a shows a comparison between the distance d provided by the double estimation function Jh and the actual distance.

For what is known as a single estimation function, the least squares criterion is applied to the values gxi of the standard response and it is assumed that b=0, in other words that the surrounding magnetic field does not vary spatially. This gives us:

$$Jg = \sum_{i=1}^{i=4} (gxi - Mgxi)^2 \quad (4)$$

where c is a constant in the equation (4), $$\frac{\partial Jh}{\partial c} = 0$$

produces the new relation:

$$c = \frac{gx1 \cdot Mgx1 + gx2 \cdot Mgx2 + gx3 \cdot Mgx3 + gx4 \cdot Mgx4}{gx1^2 + gx2^2 + gx3^2 + gx4^2} \quad (4')$$

This estimation of c provides the information stored in the magnetic strip and enables Jg to be a function of d only, and its minimum can be used to estimate the distance d for each measurement Mfxi obtained from the 5 sensors.

Figure 3B:
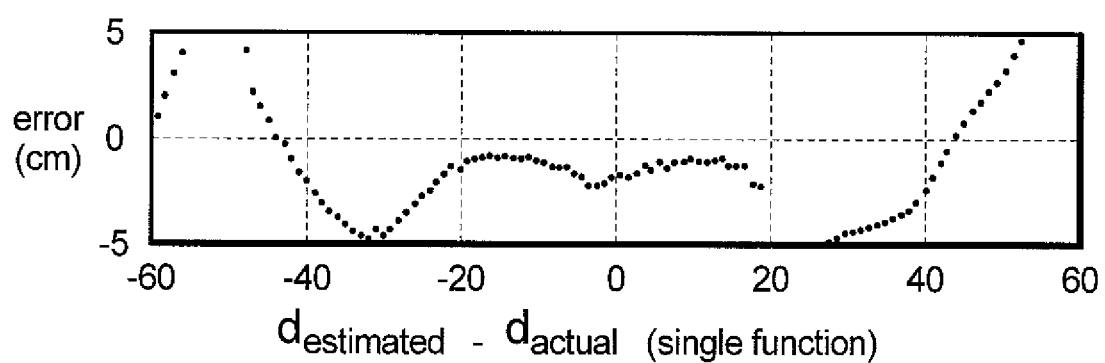
FIG. 3b shows the difference between the single function for estimating the position of the vehicle and its actual position with respect to the magnetic strip.

FIG. 3b shows a comparison between the distance d provided by the single estimation function Jg and the actual distance.

Test results show that the estimation of the distance d is better with the double estimation function, with an error of ±0.2 cm over the range of measurement (−60 cm, 60 cm) between the magnetic strip and the central sensor when the 5 sensors are positioned laterally every 25 cm and 25 cm above the ground, and when the measurement noise of each sensor is about 20% of the measurement dynamic range. The error range becomes ±5.0 cm for the single estimation function, because the variations of the surrounding magnetic field are disregarded.

Figure 4:
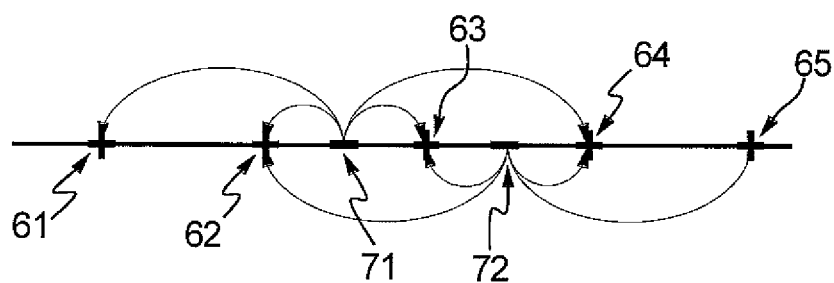
FIG. 4 shows a schematic diagram of the calibration system according to the invention.

If the double estimation function is used, it is possible for the driving assistance system and the detection device to have only four sensors. However, it may be useful to have a supplementary sensor in case one of the sensors fails. In an advantageous embodiment of the invention, the driving assistance system and the detection device can also comprise a calibration system as shown in FIG. 4, which can be used both to verify the operating state of the magnetic sensors and to eliminate disparities in the response of the sensors for a given magnetic field based on the signals measured by the sensors.

This is because the estimation of the vehicle position described above does not allow for the differences in the responses of the sensors. FIG. 4 shows the five magnetic sensors numbered 61 to 65 and aligned on an axis lying in the direction perpendicular to the principal axis of the vehicle. Two electromagnets 71 and 72 having induction coils are placed, respectively, between the second and third sensors on the one hand, and between the third and fourth sensors on the other hand. The electromagnets are useful because they can produce magnetic fields on demand, and therefore with specified values. Their measurement by the different sensors enables the processing unit to eliminate the differences between the responses of the sensors.

When the sensors are moved away from each other through a distance of the order of the height h of the sensors above the magnetic strip, and when only the Earth's magnetic field is able to interfere with the measurement, another type of algorithm can be used for estimating the distance d, using the characteristics of the magnetic field produced by the strip, particularly the position of the zeros located at a distance close to the height h on either side of the maximum amplitude of the magnetic field and the slow variation of the field beyond the distance where the zeros are located.

In a first stage, the base level NB is determined by the median of the measurements, because the number of sensors remote from the magnetic strip is greater than the number of sensors close to the latter.

In a second stage, the sensor CN having the level N farthest from the median NB, in other words |N−NB| maximum, is detected and corresponds to the sensor closest to the magnetic strip.

In a third stage, the sensor CA adjacent to the sensor CN having the level NA closest to N, in other words the smallest value of |NA−N|, is determined.

Finally, the distance d of the strip is estimated on the basis of the position xCN of the sensor CN and the position xCA of the sensor CA by:

d=(xCN*(NA−NB)+xCA*(N−NB))/(N+NA−2*NB)

As regards the information c encoded in the magnetic strip, this is given by:

c=(N+NA−2*NB)

This simplified algorithm considerably reduces the number of calculations required to determine the distance d with satisfactory accuracy, provided that the measurement noise is sufficiently weak.

Tests on a track fitted with a magnetic strip along a length of approximately 300 m were conducted, using a vehicle fitted with five sensors 15 cm above the ground. By using the simplified algorithm, the distance d could be calculated with an accuracy of the order of plus or minus 1 mm over a distance range from plus 250 mm to minus 250 mm, particularly during zigzagging (oscillation of the vehicle on either side of the strip) on the magnetic strip.

In the example of FIG. 4, comprising 5 magnetic sensors, only two electromagnets are needed if use is made of the symmetries of the detection device, since the first electromagnet 71 has an equivalent effect on the sensors 62 and 63 on the one hand and on the sensors 61 and 64 on the other hand, whereas the second electromagnet 72 has an equivalent effect on the sensors 63 and 64 on the one hand and on the sensors 62 and 65 on the other hand, as shown in FIG. 4 by the arrows between the sensors and the electromagnets. For example, if the sensor 63 is taken as the reference, the electromagnet 71 is activated in a first stage to correct the sensor 62 and discover the response of the sensor 61 with respect to the sensor 64. In a second stage, the electromagnet 72 is activated to correct the sensor 64 and consequently the sensor 61 as well, using the relation between these two sensors determined in the first stage, and to correct the sensor 65 with the sensor 62 which was corrected in the first stage A defective sensor is detected if its signal does not vary, or does not vary enough, when one or both electromagnets are activated.

Figure 5:
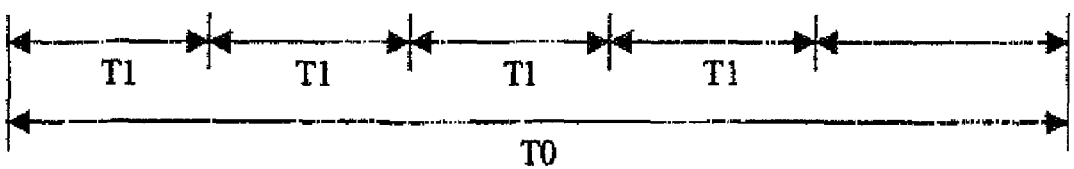
FIG. 5 shows two sequences of data acquisition by the magnetic sensors of the driving assistance system and of the detection device according to the invention, in normal and calibration mode.

FIG. 5 shows a sequence of data acquisition by the magnetic sensors shown in FIG. 4. The data acquisition is synchronous; in other words the five sensors measure the magnetic fields at the same time.

The total duration of the sequence is T0, broken down into 5 time intervals. The first four time intervals have a duration of T1 each, T1 being chosen in such a way that 4T1<T0, in order to provide a fifth time interval in which the processing unit can process and transfer the data.

For operation in normal mode, the first four time intervals are identical, and the two electromagnets produce no magnetic field. During these four phases, the sensors record the magnetic field generated by the environment and by the magnetic strip deposited on or in the infrastructure. The large number of data acquired in each of these phases enables the signal/noise ratio to be improved by allowing the calculation of the mean value of the magnetic fields within the measurement intervals.

For operation in calibration mode, the two electromagnets produce no magnetic field during the first phase, one of the electromagnets produces a magnetic field during the second phase, the two electromagnets produce no magnetic field during the third phase, and the other electromagnet produces a magnetic field during the fourth phase. During these four phases, the sensors record the magnetic field generated, on the one hand, by the electromagnets, and, on the other hand, by the environment and by the magnetic strip deposited on or in the infrastructure. The variation of the sensor signal between the first and the second phase can be used to determine the response of each sensor to the first activated electromagnet, and the variation of the sensor signal between the third and the fourth phase can be used to determine the response of each sensor to the second activated electromagnet. The sensors can be calibrated according to the difference between the measured values from one sensor to the other. The large number of data acquired in each of these phases enables the signal/noise ratio to be improved by allowing the calculation of the mean value of the magnetic fields within the measurement intervals. Additionally, the measurements in the first and third phases can be used directly to estimate the distance and information contained in the magnetic strip, as for operation in normal mode.

When the bias due to the metallic bodies and the intrinsic noise of the magnetic sensors are taken into account simultaneously, the double estimation function, for the perpendicular unidirectional magnetic field of the preceding example, can be used to estimate the distance with an accuracy of 0.2 cm over the range [−50 cm, 50 cm], and 0.4 cm over the range [−60 cm, 60 cm], the sensors being positioned 25 cm above the ground with a spacing of 25 cm between them.

The calibration system can also be used to continuously check that all the sensors are operating normally. If necessary, if one of the sensors is faulty (according to the criteria programmed into the processing unit, for example), the processing unit can disable it and/or cease to take the measured fields into account, in order not to falsify the calculation of the distance and/or the reading of the encoded information. A system with five sensors as described above enables the driving assistance system, together with the detection device, to continue to operate, even if one of the sensors is disabled as a result of a malfunction.

A variant of the driving assistance system and of the detection device consists in the introduction of one or more magnetic sensors, aligned on a second support perpendicular to the principal axis of the vehicle, but offset with respect to the preceding sensors. The additional sensors can, for example, be aligned on the rear bumper of the vehicle. Thus the knowledge of the previously calculated distance, combined with the knowledge of the second horizontal distance between the additional sensors and the magnetic strip, can be used to determine the orientation of the axis of the vehicle with respect to the road. This information can be very useful for anti-skid control, for example.

As shown in FIG. 2, the position data (distance d) and the data on the magnetization of the magnetic strip (amplitude of the magnetic field c enabling the information to be encoded) are subsequently formatted and transmitted to a module intended, in particular, to supply the vehicle with useful information on the position and the encoded data.

The magnetic marking deposited on or in the infrastructure thus defines a position reference for the vehicle in the infrastructure, and also acts as an information carrier.

Figure 6:
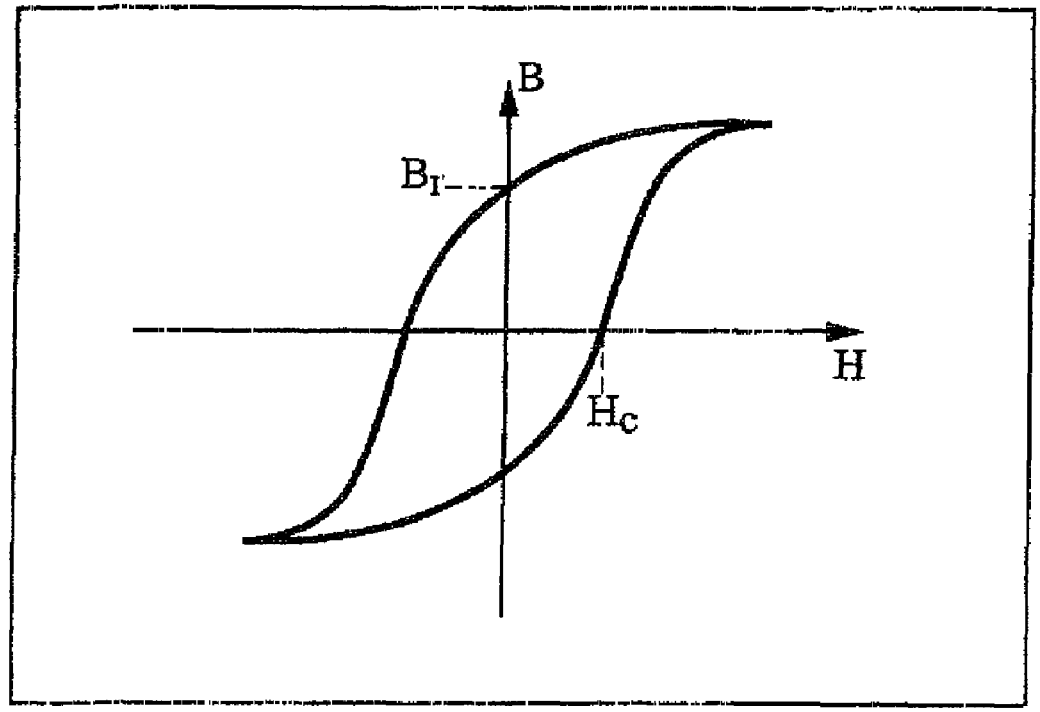
FIG. 6 shows the typical magnetization curve of the magnetic ferrites used in the production of the magnetic strip according to the invention.

The materials used to form the magnetic marking are what are known as hard magnetic materials. For these materials, the magnetization curve has a hysteresis cycle as shown in FIG. 6, characterized by the value of the remanent magnetic field Br and that of the coercive magnetic excitation field Hc. Hard magnetic materials are magnetized by applying an external magnetic excitation field to them. When this magnetic excitation field ceases to be applied, the magnetization of the material is equal to the remanent field Br. The value of this field Br must be sufficient to be detectable by the sensors of the vehicle. The value of the field Br can also be changed by applying a magnetic field which is different, but greater than the value of the coercive field Hc. The remanent magnetization Br must be greater than 1000 gauss to ensure that the magnetic field produced at one meter is appropriately detected by present-day conventional sensors.

Hard magnetic materials can be supplied in the form of particles, and more particularly in the form of powders, beads or chips.

The particle sizes can vary from a few nanometers to more than one or two millimeters. The coercive magnetic field Hc can vary from about 1 to 20 000 oersteds, and preferably from 5 to 5000 oersteds. The particles with a coercion field of less than 5 oersteds can be too easily demagnetized, whereas particles having an Hc of more than 5000 oersteds require very specialized and costly equipment for their magnetization.

Preferably, the hard magnetic materials are of the stable magnetic oxide class, also known as magnetic ferrites. Those which are most commonly used are barium hexaferrite, $BaFe_{12}O_{19}$, and strontium hexaferrite, $SrFe_{12}O_{19}$. The strontium and barium can be replaced by lead. Other hard magnetic materials could be used, such as cubic ferrites, which can take the form of elongated needles, such as magnetite, $Fe_3O_4$, and gamma ferric oxide, gamma-$Fe_2O_3$. These magnetic ferrites are produced in large quantities and are stable when stored outside.

Other possible hard magnetic materials are chromium dioxide and metal alloys such as Alnico (aluminum-nickel-cobalt-iron alloy), iron-based alloys, iron-carbon, iron-cobalt, iron-cobalt-chromium, iron-cobalt-molybdenum, copper-nickel-iron, manganese-aluminum, cobalt-platinum, etc.

In particle form, the remanent magnetic field of hard magnetic materials has no preferred direction. This format permits easy incorporation into road and highway marking compounds. These compounds, intended for road signaling, can be hot-melt substances which are deposited in the form of molten substances. There are also known cold-applied substances which are applied in the form of prepared polymer solutions, based on polymerizable monomers, for example. There are also known road and highway marking paints, generally based on resins dissolved in organic solvents, or water-based polymer dispersions, to which various additives can be added if required to accelerate the generally slow drying of water-based paints. As well as the fluid compounds, there is a known method of depositing a preformed strip, produced by preliminary manufacture of the strip, and unwound on to the road as it is applied. The magnetic marking deposited on or in the infrastructure can therefore take different forms.

These various types of compound generally contain fillers and pigments.

The addition of pigment to the compound is optional if the visibility of the magnetic marking on the infrastructure is to be limited, when it is separate from the signaling strips. It is also possible to add pigments in order to make the strip completely invisible to the human eye.

The hard magnetic materials incorporated into such a compound can then be deposited on an infrastructure in the form of a strip which may or may not be continuous, by means of conventional devices such as spray devices, for example those described in U.S. Pat. No. 6,505,995 and U.S. Pat. No. 4,401,265. In this case, the magnetic marking of the infrastructure according to the invention takes the form of a magnetic strip which may or may not be continuous. In the case of a discontinuous magnetic strip, the marking compound can be deposited at intervals which may or may not be regular.

The strip can also be deposited in the infrastructure, by providing a shallow recess for this purpose, so that it can then be covered with another material to fill in the recess to mask the paint and make the magnetic strip more durable.

This magnetic strip, deposited in this way, can act as an information carrier by forming successive portions of strips, or elementary intervals, with a variable and multidirectional magnetization assigned to each portion. The portions or intervals may touch each other (continuously deposited strip) or not (discontinuous strip). These intervals, as in the diagram of FIG. 1 (references 31 and 32) can be distributed regularly along the length of the magnetic strip. In a specific embodiment, the elementary intervals have a length in the range from once to four times the mean height between said magnetic strip and the on-board magnetic sensors, and preferably a length in the range from once to twice this mean height.

The variations of the magnetic field from one interval to the next, regardless of whether or not the strip is continuously deposited, can include a single change of direction in the case of a unidirectional magnetic field, thus enabling a sequence of logical states "0" and "1" to be represented for a binary coding of the information. The coding can be more complex if allowance is made for the plurality of components of the magnetic field. It is also possible to vary its amplitude.

The recording or modification of the information is carried out by applying an external field greater than the coercive field, so as to leave a remanent magnetization, or change the existing magnetization. This operation can be carried out by the passage of a special mobile element above the strip. The value of the coercive field Bc of the hard magnetic material used must be sufficient to ensure that parasitic magnetic fields (such as the Earth's magnetic field) do not modify the encoded information.

The information encoded in this strip can be of various kinds:
   reminders about the infrastructure signaling (speed limit, no entry, etc.),
   topographic data about the infrastructure (gradient, radius of curvature of corners, etc.),
   temporary information (road works, diversions, etc.),
   commercial information (temporary cultural events, nearby rest areas, fuel prices, tourist sites in the vicinity, etc.).

Clearly, this information has to be changeable over time. However, the intervals of renewal are not necessarily the same. Furthermore, the information does not all have the same importance, since some kinds are purely commercial or cultural, while other kinds of information relate to the safety of the vehicle. It must be possible to rank the information in a hierarchy.

This is why it is useful to introduce a plurality of hard magnetic materials (at least two) into the same paint, to make it possible to encode different kinds of information with different safety levels. Thus, the most important information (signaling, topographic data, etc.) is encoded with materials which are hardest magnetically (having the highest Hc>200 oersteds), and the less important information (cultural events, fuel prices, etc.) is encoded with materials which are less hard magnetically (smallest Hc>1 oersted). The mobile element capable of modifying the less important information is a light vehicle which can travel on the infrastructure at the same speed as the other mobile elements. Another benefit of the information coding hierarchy is the fact that the very important information can only be modified by a special-purpose vehicle which is large because of the metallic bodies needed to create fields greater than the coercive fields of the materials which are very hard magnetically. Thus, if there is an error in the programming of the less important messages, the very important messages cannot be erased.

The system is also advantageous in that it can be made self-financing by using recorded commercial messages intended for users of vehicles.

Another advantage of the magnetic marking according to the invention is that, if local deterioration of the magnetic strip occurs, the detection device will only lose a limited number of bits of information. The driving assistance system therefore continues to operate in such cases. It is also possible to consider providing a degree of redundancy in the information, particularly for important information, for example by using multidirectional magnetic fields for each interval, so as to repeat this important information several times.

The invention claimed is:

1. A driving assistance system for supplying information to a vehicle traveling on an infrastructure, the system comprising:
   a magnetic marking formed on or in the infrastructure and adapted to encode the information intended for said vehicle, said information being modifiable,
   a detection device comprising a plurality of magnetic sensors placed on board said vehicle to detect a total magnetic field comprising the magnetic field generated by said magnetic marking and to produce signals representing said total magnetic field, and a processing unit adapted to process said representative signals and to determine, on the one hand, a first distance between said vehicle and said magnetic marking, and, on the other hand, to decode the information encoded in said magnetic marking;

wherein the plurality of magnetic sensors comprises at least three magnetic sensors; and wherein at least one of the first and second distances, and the information encoded in the magnetic marking, are determined by the processing unit on the basis of an estimation function comprising the comparison, by at least squares criterion, of the values read by each of the magnetic sensors (Mfxi, Mgxi, Mhxi) with the values of a standard response of said sensors (fxi, gxi, hxi) which is a function of the total magnetic field, and each of the positions of said magnetic sensors (xi), the estimated values of the distances and of the information being the values which best fit to said read values.

2. The driving assistance system as claimed in claim 1, in which the magnetic marking is formed by depositing a marking compound intended for road signaling, to which are added one or more magnetic materials in the form of particles, said particles being capable of receiving remanent magnetization when subjected to a magnetic field greater than the coercive magnetic excitation fields of said particles, the remanent magnetization of said particles being adapted to encode the information intended for said vehicle.

3. The driving assistance system as claimed in claim 2, in which there are at least two different varieties of magnetic materials in the magnetic marking, each having a different coercive magnetic excitation field, so that the information intended for the vehicle can be encoded with different safety levels, the most important information being encoded with the magnetic materials having the highest coercive magnetic excitation fields.

4. The driving assistance system as claimed in claim 1, in which the magnetic marking is deposited in a substantially continuous way in the form of a magnetic strip, and in which the information is encoded at substantially regular elementary intervals along the length of said magnetic strip, each of said elementary intervals having its own multidirectional magnetic field.

5. The driving assistance system as claimed in claim 1, in which the magnetic marking is deposited in the form of a discontinuous magnetic strip formed by substantially regular elementary intervals, and the information is encoded in each regular elementary interval, each of said elementary intervals having its own multidirectional magnetic field.

6. The driving assistance system as claimed in claim 4, in which the elementary interval has a length in the range from once to twice the mean height between the magnetic strip and the on-board magnetic sensors.

7. The driving assistance system as claimed in claim 4 in which the multidirectional magnetic field comprises at least a first component in a direction substantially perpendicular to, but coplanar with, the direction of the magnetic strip.

8. The driving assistance system as claimed in claim 2, in which the particles of magnetic materials are associated with a resin.

9. The driving assistance system as claimed in claim 2, in which the magnetic materials are magnetic ferrites.

10. The driving assistance system as claimed in claim 2, in which the particles of magnetic materials take the form of powders, beads or chips whose diameters range from 10 nm to 2 mm.

11. The driving assistance system as claimed in claim 2, in which the compound intended for road signaling is a paint, preferably water-based.

12. The driving assistance system as claimed in claim 1, in which the processing unit also being adapted to eliminate the surrounding magnetic field from the total magnetic field on the basis of the representative signals from the magnetic sensors.

13. The driving assistance system as claimed in claim 12, comprising at least a fourth magnetic sensor, and in which the processing unit is also adapted to take into account the bias due to the variations of the surrounding magnetic field, particularly those due to the distribution of metallic bodies, on the basis of the representative signals from said magnetic sensors.

14. The driving assistance system as claimed in claim 13, in which the magnetic sensors are aligned on a first axis substantially perpendicular to the axis of the vehicle.

15. The driving assistance system as claimed in claim 14, comprising at least one supplementary magnetic sensor positioned on a second axis, separate from the first axis, in such a way that the processing unit determines a second distance between the vehicle and the magnetic marking, the processing unit determining on the basis of the first and the second distance the orientation of the vehicle with respect to its direction of movement on the infrastructure.

16. The driving assistance system as claimed in claim 12, additionally comprising devices for calibrating the magnetic sensors, these devices being capable of producing supplementary magnetic fields of specified values, the processing unit also being adapted to verify the operating state and to eliminate the disparities in the responses of said magnetic sensors on the basis of the representative signals of said magnetic sensors.

17. The driving assistance system as claimed in claim 16, in which the calibration systems comprise electromagnets.

18. The driving assistance system as claimed in claim 12, in which the magnetic sensors are magnetoresistive sensors, Hall effect sensors, or current loop sensors.

19. The driving assistance system as claimed in claim 12, in which at least one of the first and second distances (d), and the information (c) encoded in the magnetic marking, are calculated on the basis of the values read by each of the magnetic sensors (Mfxi) and the following values:

NB=median value of said read values,

N=read value corresponding to the value farthest from said median value, and read on the sensor CN in position xCN, NA=read value corresponding to the value closest to said median, and read on the sensor CA in position xCA, as claimed in the formula:

$$d=(xCN*(NA-NB)+xCA*(N-NB))/(N+NA-2*NB),$$

$$c=(N+NA-2*NB).$$

20. The detection device for the driving assistance system as claimed in claim 1, comprising the plurality of magnetic sensors intended to be placed on board the vehicle to detect the total magnetic field comprising the magnetic field generated by the magnetic marking formed on or in the infrastructure, and to produce signals representing said total magnetic field, and the processing unit adapted to process said representative signals and to determine a first distance between said vehicle and said magnetic marking, and in which the plurality of magnetic sensors comprises at least three magnetic sensors, and the processing unit is also adapted to eliminate the surrounding magnetic field from the total magnetic field on the basis of said representative signals.

21. The detection device as claimed in claim 20, comprising at least a fourth magnetic sensor, and in which the processing unit is also adapted to take into account the bias due to the variations of the surrounding magnetic field, particularly those due to the distribution of metallic bodies, on the basis of the representative signals from said magnetic sensors.

22. The detection device as claimed in claim 21, in which the magnetic sensors are aligned on a first axis substantially perpendicular to the axis of the vehicle.

23. The detection device as claimed in claim 22, comprising at least one supplementary magnetic sensor positioned on a second axis, separate from the first axis, in such a way that the processing unit determines a second distance between the vehicle and the magnetic marking, the processing unit determining on the basis of the first and the second distance the orientation of the vehicle with respect to its direction of movement on the infrastructure.

24. The detection device as claimed in claim 20, additionally comprising devices for calibrating the magnetic sensors, these devices being capable of producing supplementary magnetic fields of specified values, the processing unit also being adapted to verify the operating state and to eliminate the disparities in the responses of said magnetic sensors on the basis of the representative signals of said magnetic sensors.

25. The detection device as claimed in claim 24, in which the calibration systems comprise electromagnets.

26. The detection device as claimed in claim 20, in which the magnetic sensors are magnetoresistive sensors, Hall effect sensors, or current loop sensors.

27. The detection device as claimed in claim 20, in which at least one of the first and second distances (d), and the information (c) encoded in the magnetic marking, are calculated on the basis of the values read by each of the magnetic sensors (Mfxi) and the following values:
NB=median value of said read values,
N=read value corresponding to the value farthest from said median value, and read on the sensor CN in position xCN,
NA=read value corresponding to the value closest to said median, and read on the sensor CA in position xCA,
according to the formula:

$$d=(xCN*(NA-NB)+xCA*(N-NB))/(N+NA-2*NB),$$

$$c=(N+NA-2*NB).$$

28. The vehicle which can travel on the infrastructure comprising the magnetic marking formed on or in said infrastructure and adapted to encode information intended for said vehicle, and fitted with the detection device as claimed in claim 20, said device making it possible to determine at least the first distance between said vehicle and said magnetic marking, and to decode the information encoded in said magnetic marking.

29. The infrastructure for the driving assistance system as claimed in claim 1, comprising the magnetic marking formed on or in said infrastructure, and adapted to encode information intended for the vehicle traveling on said infrastructure, the magnetic marking being formed by the deposition of a marking compound intended for road signaling, to which are added one or more magnetic materials in the form of particles, these particles being capable of receiving remanent magnetization when subjected to a magnetic field greater than the coercive magnetic excitation fields of these particles, the remanent magnetization of said magnetic marking being adapted to encode the information intended for said vehicle.

30. The infrastructure as claimed in claim 29, in which there are at least two different varieties of magnetic materials in the magnetic marking, each having a different coercive magnetic excitation field, so that the information intended for the vehicle can be encoded with different safety levels, the most important information being encoded with the magnetic materials having the highest coercive magnetic excitation fields.

31. The infrastructure as claimed in claim 29, in which the magnetic marking is deposited in a substantially continuous way in the form of a magnetic strip, and in which the information is encoded at substantially regular elementary intervals along the length of said magnetic strip, each of said elementary intervals having its own multidirectional magnetic field.

32. The infrastructure as claimed in claim 29, in which the magnetic marking is deposited in the form of a discontinuous magnetic strip formed by substantially regular elementary intervals, and the information is encoded in each regular elementary interval, each of said elementary intervals having its own multidirectional magnetic field.

33. The infrastructure as claimed in claim 29, in which the multidirectional magnetic field comprises at least a first component in a direction substantially perpendicular to, but coplanar with, the direction of the magnetic marking.

34. The infrastructure as claimed in claim 29, in which the particles of magnetic materials are associated with a resin.

35. The infrastructure as claimed in claim 29, in which the magnetic materials are magnetic ferrites.

36. The infrastructure as claimed in claim 29, in which the particles of magnetic materials take the form of powders, beads or chips whose diameters range from 10 nm to 2 mm.

37. The infrastructure as claimed in claim 29, in which the compound intended for road signaling is a paint, preferably water-based.

38. A driving assistance method for a vehicle traveling on an infrastructure, comprising a magnetic marking formed on or in said infrastructure and adapted to encode information intended for said vehicle, said vehicle having a detection device which comprises a plurality of magnetic sensors placed on board said vehicle to detect a total magnetic field comprising the magnetic field generated by the magnetic marking, and to produce signals representing said total magnetic field, and a processing unit for the representative signals, the method comprising the following steps:
 a) using the plurality of magnetic sensors to measure the total magnetic field,
 b) using the processing unit to determine the information encoded in the magnetic marking on the basis of said representative signals,
 c) using the processing unit to determine a first distance between said vehicle and said magnetic marking on the basis of said representative signals,
 d) transmitting said encoded information and said first distance to a module forming an interface with the driver of the vehicle;
  wherein the plurality of magnetic sensors comprises at least three magnetic sensors; and
  wherein at least one of the first and second distances, and the information encoded in the magnetic marking, are determined by the processing unit on the basis of an estimation function comprising the comparison, by at least squares criterion, of the values read by each of the magnetic sensors (Mfxi, Mgxi, Mhxi) with the values of a standard response of said sensors (fxi, gxi, hxi) which is a function of the total magnetic field, each of the positions of said magnetic sensors (xi), the estimated values of the distances and of the information being the values which press fit to said read values.

39. The driving assistance method as claimed in claim 38, in which, the processing unit also being adapted to eliminate the surrounding magnetic field from the total magnetic field on the basis of said representative signals.

40. The driving assistance method as claimed in claim 39, in which the plurality of magnetic sensors comprises at least a fourth magnetic sensor, the processing unit also being adapted to take into account the bias due to the variations of the surrounding magnetic field, particularly those due to the distribution of metallic bodies, on the basis of the representative signals from said magnetic sensors.

41. The driving assistance method as claimed in claim 40, in which the magnetic sensors are aligned on a first axis substantially perpendicular to the axis of the vehicle.

42. The driving assistance method as claimed in claim 41, comprising at least one supplementary magnetic sensor positioned on a second axis, separate from the first axis, in such a way that the processing unit determines a second distance between the vehicle and the magnetic strip, the processing unit determining on the basis of the first and the second distances the orientation of the vehicle with respect to its direction of movement on the infrastructure.

43. The driving assistance method as claimed in claim 39, in which the magnetic marking is formed by depositing a marking compound intended for road signaling, to which are added one or more magnetic materials in the form of particles, said particles being capable of receiving remanent magnetization when subjected to a magnetic field greater than the coercive magnetic excitation fields of said particles, the remanent magnetization of said magnetic marking being adapted to encode the information intended for said vehicle.

44. The driving assistance method as claimed in claim 43, in which there are at least two different varieties of magnetic materials in the magnetic marker, each having a different coercive magnetic excitation field, so that the information intended for the vehicle can be encoded with different safety levels, the most important information being encoded with the magnetic materials having the highest coercive magnetic excitation fields.

45. The driving assistance method as claimed in claim 44, in which at least one of the first and second distances (d), and the information (c) encoded in the magnetic strip, are calculated on the basis of the values read by each of the magnetic sensors (Mfxi) and the following values:

NB=median value of said read values,

N=read value corresponding to the value farthest from said median value, and read on the sensor CN in position xCN, NA=read value corresponding to the value closest to said median, and read on the sensor CA in position xCA, according to the formula:

$$d=(xCN*(NA-NB)+xCA*(N-NB))/(N+NA-2*NB),$$

$$c=(N+NA-2*NB).$$

* * * * *